UNITED STATES PATENT OFFICE.

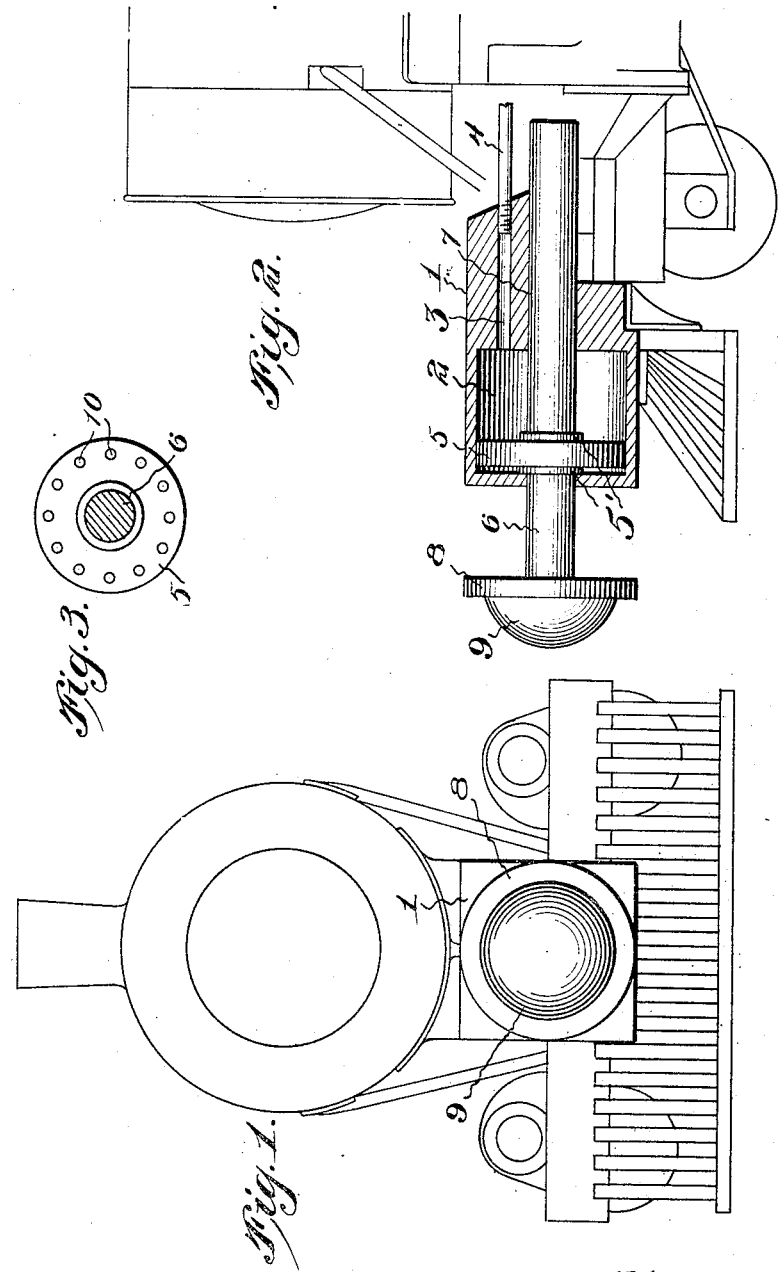

ALBERT M. GRAY, OF ROANOKE, VIRGINIA.

SHOCK-ABSORBER.

969,052.      Specification of Letters Patent.      Patented Aug. 30, 1910.

Application filed February 14, 1907. Serial No. 357,304.

*To all whom it may concern:*

Be it known that I, ALBERT M. GRAY, a citizen of the United States, residing at Roanoke, in the county of Roanoke and State of Virginia, have invented new and useful Improvements in Shock-Absorbers, of which the following is a specification.

The invention relates to an improvement in shock absorbers designed primarily for use with locomotives, or similar power propelled vehicles.

The main object of the present invention resides in the production of a shock absorber of the pneumatic type, designed to be secured as the advance portion of a power propelled vehicle, and constructed to absorb, in so far as possible, the initial shock incident to a collision of the vehicle with another body.

The invention will be described in the following specification, reference being had particularly to the accompanying drawings, in which:—

Figure 1 is a view in front elevation showing a locomotive provided with my improved shock absorber, Fig. 2 is a partial side elevation of the same, the shock absorber being illustrated partly in section, Fig. 3 is a face view of the piston of the shock absorber.

Referring particularly to the drawings, my improved shock absorber comprises a casting 1, of appropriate size and strength, designed to be fixedly secured to the relatively forward portion of the supporting frame-work of the vehicle. The relatively forward portion of the casting is cored or otherwise formed to provide a cylinder 2, which, through the medium of a port 3 in the casting in rear of the cylinder and a communicating pipe 4, may be supplied with compressed air from the main reservoir of the vehicle, or other source of supply.

Within the cylinder 2 is mounted a piston 5, centrally of which is secured a stem 6, opening through the forward wall of the cylinder, and preferably extending rearward and guided in an opening 7 formed in the casting, whereby longitudinal movement of the stem is permitted and lateral movement guarded against. The relatively outer or free end of the stem 6 is provided with a buffer disk 8, on the forward face or surface of which is secured an approximately semi-cylindrical buffer 9, of relatively soft material, as lead, or the like. The piston 5 is preferably formed with a concentric row of small openings 10 arranged adjacent the peripheral edge of the piston to provide for the gradual passage of a resisting medium in the movement of the piston.

In use, the piston 5 is maintained at the forward portion of the cylinder under the influence of the pressure from the main reservoir, so that in the event of collision or other impact the piston is gradually forced rearward against the pressure behind it, with the effect to gradually absorb the shock and very gradually transmit the same to the frame of the vehicle. After complete movement of the piston under the influence of the shock the pressure within the cylinder 2 will be found to have practically equalized itself on both sides the piston.

The invention provides a simple means for partially absorbing the shock due to the head impact of the vehicle with another body, and for transmitting said shock to the frame of the vehicle in a very gradual manner.

It will be seen that when the piston 5 is at the full outstroke of its movement the distance between the main rear body of the structure and the inner face of the piston will slightly exceed the distance between the inner face of the head 8 and the outer face of the cylinder so that when the piston is at the full in stroke of its movement the innermost ring 5′ thereof will abut the main body of the structure at the central portion thereof applying the full force of the shock to this point. Incident to the peculiar construction of the apparatus and to the fact that the head 8 and piston 5 are so arranged upon the rod when the piston is at the full instroke of its movement the head 8 will be held spaced from the outer end of the cylinder and no force whatsoever can be applied thereto or to the walls of the cylinder, hence the latter is held against becoming ruptured incident to the sudden inward movement of the buffer. Besides applying the shock to that part of the structure where no damage will result when the buffer is moved inwardly the piston 5 will also be held against buckling, incident to the fact that it is never brought into full contact with the main body of the structure, as will be appreciated.

Having thus described the invention what is claimed as new, is:—

A shock absorber for vehicles comprising a casting having a forward portion formed to provide a horizontally disposed cylinder which is closed at its outer end, said casting being provided rearwardly of the cylinder with a main body portion which is supported by and fixed to the forward portion of the vehicle frame, said main body having a central horizontally disposed passage formed therein, the closed outer end of the said cylinder having a passage formed therein and located in line with the said first named passage, a rod slidable in the said passages and through the cylinder, a head at the outer end of the rod, a soft metal buffer extending from the forward face of the said head, a piston mounted upon the rod and adapted for movement in the cylinder and provided with means adapted upon its full instroke in the cylinder to engage the said main body of the casting to apply the full force of the shock thereto and to prevent engagement of the buffer-carrying head with the head of the cylinder to prevent the shock from rupturing the said cylinder, said buffer head being adapted for manual operation to impart an outward sliding movement to the rod to position the piston thereon immediately adjacent the head of the cylinder, and means for introducing a fluid into the cylinder so that the piston will be held at the full outstroke of its movement.

In testimony whereof, I affix my signature in presence of two witnesses.

ALBERT M. GRAY.

Witnesses:
 LILIAN S. GREENWOOD,
 LAMAR SHERERTZ.